Sept. 2, 1930.                    J. D. WOOD                    1,775,012
            FLUID CONTAINING CASING FOR ELECTRICAL APPARATUS
                       Original Filed June 30, 1926

Inventor,
Joseph D. Wood
by
[signature] Atty

Patented Sept. 2, 1930

1,775,012

UNITED STATES PATENT OFFICE

JOSEPH D. WOOD, OF BETHLEHEM, PENNSYLVANIA, ASSIGNOR TO CONDIT ELECTRICAL MANUFACTURING CORPORATION, OF SOUTH BOSTON, MASSACHUSETTS, A CORPORATION OF MASSACHUSETTS

FLUID-CONTAINING CASING FOR ELECTRICAL APPARATUS

Application filed June 30, 1926, Serial No. 119,772. Renewed March 21, 1929.

This invention relates to electric switches and particularly to the type of switch illustrated in my copending applications Serial No. 745,994, filed October 27, 1924; and Serial No. 102,055, filed April 14, 1926.

The electric switch illustrated in the aforesaid applications is of the manhole type and the lead-sheathed, high-tension electric cables comprising the circuit leads are extended into the switch casing and through transformer wells formed in the tops of the casing and through depending tubular insulators and are terminated at and are electrically connected with contact blocks carried at the lower ends of the insulators. The top portion of the switch casing, containing the well for the current transformer is usually made of cast material as cast steel for strength. The lead sheath of the cable is terminated at the bottom of the transformer well and it, or a metal extension thereof, is flared outwardly away from the conductor and the insulation thereon, to reduce the electrostatic stress on the cable insulation at the terminus of the sheath.

For some purposes, it is desirable to fill the transformer well with oil or other insulating fluid whereby to provide enhanced insulation for the current transformer and for the cable insulation at the end of the enclosing sheath. The cast metal casing cannot be depended upon to maintain the transformer well fluid tight since the casing is liable to have blow holes, slag streaks, and the like faults through which the oil in the transformer well can leak and thereby escape.

It is an object of this invention to provide an oil retaining casing of an electric switch with an internally-disposed fluid-impervious lining that is adapted to retain the oil indefinitely.

A further object is generally to improve the construction of electric switches.

Figure 1:
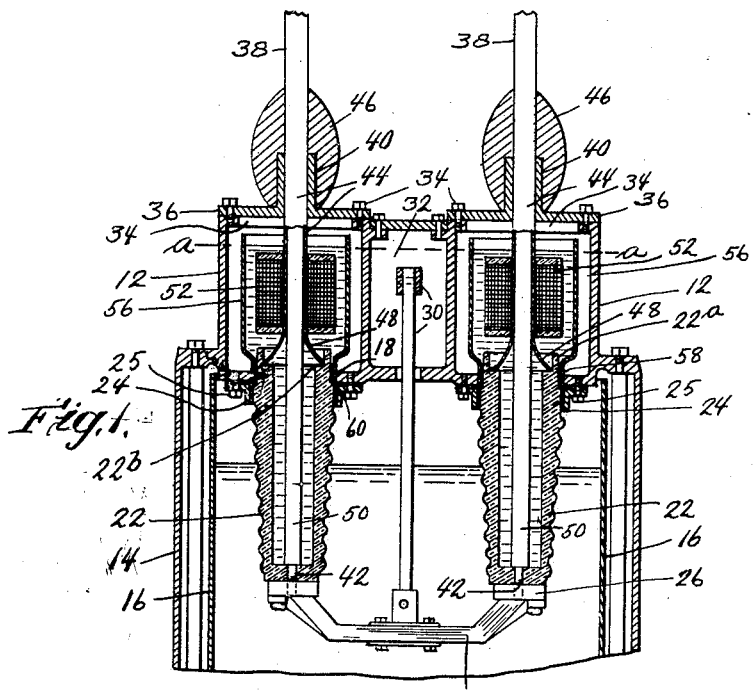
Fig. 1 is a sectional elevation of an electric switch embodying the invention.
Figure 2:
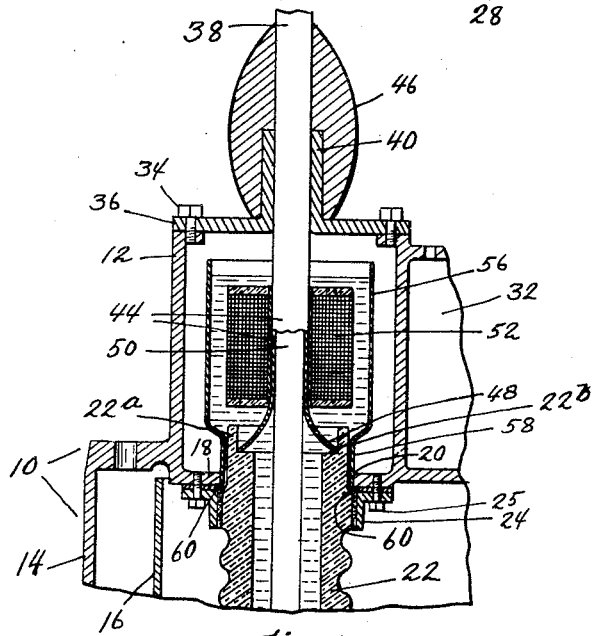
Fig. 2 is an enlarged sectional detail through the transformer well of the switch casing of Fig. 1.

As here shown, the electric switch embodying this invention comprises a cast steel casting 10 formed with transformer wells 12 in the upper portion thereof and with a depending side wall 14 which encloses the oil containing receptacle 16 in which the switch members are immersed. The transformer wells 12 are provided with bottom walls 18 which have apertures 20 therein. Tubular insulating members 22 are secured dependingly by attaching flanges 24 and bolts 25 to the lower faces of said walls 18 in alignment with the openings 20 therein. The upper ends $22^a$ of said insulating members preferably are extended into the transformer well and are provided with annular grooves $22^b$ adapted to receive the ends of the cable sheaths. Contact members 26 are carried by the lower end of said insulators and are adapted to be bridged and electrically connected by the movable switch member 28 which is connected with and supported by suitable switch operating mechanism 30 contained in a mechanism well 32 disposed between said transformer wells. Said transformer wells are provided with top openings 34 which are normally closed by cover plates 36. Lead-sheathed, high tension electric cables 38 are extended through the necks 40 of said cover plates and the conductors 42 of said cables are electrically connected with said contact blocks 26. The connection between said contact blocks and said cables is such that the lower end of said insulators 22 are oil tight so that the insulators are adapted to retain oil. The lead sheaths 44 of said cables are secured to the necks 40 of said cover plates 36 by masses of solder 46 to form mechanically tight and also moisture tight connections therewith. The lead sheaths are terminated at the lower part of said transformer wells and are flared outwardly at 48 whereby to reduce the electro-static stresses on the cable insulation 50 at this point; and the flared ends are received in the grooves $22^b$ in the insulating members. The cable insulation, however, is extended downwardly within the insulators 22 and is terminated at or adjacent the bottoms thereof.

Current transformers 52 of any usual or suitable constructions are disposed within said transformer wells and about said cables. Said transformer wells and said insulators are adapted to contain oil to some level that is above the tops of the ends of the lead sheaths and preferably also above the tops of said transformers, whereby to enhance the insulation of the cables at the point of greatest electro-static stress and also to increase the insulation of the transformers. As previously set forth, the cast metal casing forming the walls of said transformer wells can not be depended upon to retain oil since the minute imperfections as blow holes, and the like, render the casting more or less porous and leaky. In accordance with this invention, I provide an oil retaining lining for the transformer well comprising an open-ended metal tubular member 56 which is formed of rolled sheet metal and is thereby fluid impervious. Said member is disposed within said transformer well about and spaced from the current transformer. Said member is provided with a reduced lower portion or neck 58 which is received within the aperture 20 in the lower wall 18 in the transfomer well and is adapted to fit snugly therein. Said neck is secured in a fluid tight manner to said wall by a mass of welding material 60 which overlaps and seals the joint between said neck and said wall 18. Said member and the insulator in communication therewith is adapted to be filled with oil to some normal level a—a which is above the top of the transformer and below the open top of said lining-member while the space in the transformer well about said member may be free from oil. Since said member is formed of sheet metal, it is impervious to the oil and will retain the oil indefinitely as the joint between the lower end of said member and the wall 18 is sealed.

The construction may be otherwise modified without departing from the spirit of the invention.

I claim:

1. In an electrical apparatus, the combination of a casing having an opening in its bottom wall, a tubular fluid-retaining insulator carried dependingly by said bottom wall in register with said opening and having a fluid-tight connection with said casing, an open-ended fluid-retaining shell disposed within said casing mainly above said bottom wall and having its lower open end surrounding the opening in said casing-wall, and means providing a fluid-tight connection between said casing-wall and the lower end of said shell.

2. In an electrical apparatus, the combination of a casing having an opening in its bottom wall, a tubular fluid-retaining insulator carried dependingly by said bottom wall in register with said opening and having a fluid-tight connection with said casing, an open-ended fluid-retaining shell disposed within said casing mainly above said bottom wall and having its lower open end surrounding the opening in said casing-wall and welded to said casing-wall to provide a fluid-tight connection therewith.

3. In an electric apparatus, the combination of a casing having an opening in its bottom wall, a tubular fluid-retaining insulator carried dependingly by said bottom wall in register with said opening and having a fluid-tight connection with said casing, a conductor extended through said casing and into said insulator, a transformer contained within said casing about said conductor, and an open-ended, fluid-retaining metal shell disposed within said casing about said transformer with its upper end terminated above the top of said transformer and its lower open end surrounding the opening in said casing-wall and welded thereto to provide a fluid-tight connection therewith.

4. In an electrical apparatus, a fluid-containing casing having an opening in its bottom wall, a tubular, fluid-retaining insulator carried dependingly by said bottom wall in register with said opening, means providing a fluid-tight detachable connection between said casing-wall and said insulator, an open-bottom metal shell located above said wall and insulator and in line therewith, means providing a fluid-tight connection between the open-bottom of said shell and said bottom wall, and a conductor extended through said casing and shell and into said insulator, said insulator and said shell adapted to contain an insulating fluid.

5. In an electrical apparatus, a fluid-containing casing having an opening in its bottom wall, a tubular, fluid-retaining insulator carried dependingly by said bottom wall in register with said opening, means providing a fluid-tight detachable connection between said casing-wall and said insulator, an open-bottom metal shell located above said wall and insulator and in line therewith, means providing a fluid-tight connection between the open-bottom of said shell and said bottom wall, a conductor extended through said casing and shell and into said insulator, and a transformer contained in said shell about said conductor, said insulator and said shell adapted to contain an insulating fluid.

6. In an electrical apparatus, the combination of an enclosing casing having vertically-spaced upper and lower walls provided with openings therein, an insulating oil-containing bushing in register with the opening in and having a fluid-tight connection with said lower wall, a conductor extended through the openings in said walls and into said bushing, a transformer surrounding said conductor between said walls, and a fluid-impervious oil-containing, open-bottom, metal shell located in the space between said walls about said conductor and insulated therefrom and about and upstanding above said transformer and having means securing its open bottom in fluid-tight connection with said bottom wall in register with the opening therein.

7. In an electrical apparatus, the combination of a vertical oil-containing insulating bushing having an open-ended oil-containing metal shell upstanding above and in fluid-tight connection with the upper end of the bushing and in communication with the interior thereof, a conductor extended through said shell and bushing and insulated from said shell, and a transformer surrounding said conductor in said shell and immersed in the oil therein.

8. In an electrical apparatus, the combination of a housing having a bottom wall provided with an opening therein, an open-bottom oil-retaining shell located in said housing and said opening, an insulator secured to said wall over both said openings and constituting a closure therefor, a conductor passed into said housing and said shell and insulator, and a transformer located in said shell about said conductor.

9. In an electrical apparatus, the combination of an enclosing housing having a fluid-permeable wall, an oil-containing receptacle located within said housing having a fluid-impermeable wall, a conductor passed through said housing and receptacle, and a transformer immersed in the oil in said receptacle in surrounding relation with said conductor.

10. In an electrical apparatus, a housing having a wall provided with an opening therein, an oil-containing receptacle located in said housing having an open bottom and a surrounding side wall that has an oil-tight connection with said housing-wall around the opening therein, an insulator constituting a cover for both openings, a conductor passed into said housing and said receptacle and insulator, and a transformer in said receptacle in surrounding relation with said conductor.

11. In an electrical apparatus, the combination of a housing having cast-metal walls one of which has an opening therethrough, a shell-metal oil-retaining receptacle located in said housing having an opening therein in register with the opening in said wall, means providing an oil-tight joint between said receptacle and said wall about the opening therein, a conductor extended through said housing and receptacle, and a transformer surrounding said conductor within said receptacle.

12. The combination of a casing for an electrical apparatus having a wall provided with an opening therein, a fluid-retaining shell located in said casing having a fluid-tight side wall and an open bottom, means securing said shell in an oil-tight manner to said casing wall about the opening therein, a conductor extended through said casing and shell, and a transformer surrounding said conductor within said shell.

13. The combination of the casing of an oil-insulated electrical apparatus, an insulator carried by said casing, a conductor extended into said casing and insulator, a transformer surrounding said conductor, and means to maintain a body of oil about said transformer and out of contact with the wall of said casing.

In testimony whereof, I have signed my name to this specification.

JOSEPH D. WOOD.